(12) United States Patent
Acosta (10) Patent No.: US 9,803,775 B2
(45) Date of Patent: Oct. 31, 2017

(54) DOUBLE ACTION FLOAT VALVE (71) Applicant: Hugo Antonio Munoz Acosta, Chihuahua (MX)

(72) Inventor: Hugo Antonio Munoz Acosta, Chihuahua (MX)

(*) Notice: Subject to any disclaimer, the term of this patent is extended or adjusted under 35 U.S.C. 154(b) by 0 days.

(21) Appl. No.: 14/302,265

(22) Filed: Jun. 11, 2014

(65) Prior Publication Data
US 2014/0290757 A1  Oct. 2, 2014

Related U.S. Application Data (63) Continuation-in-part of application No. 14/035,672, filed on Sep. 24, 2013, now Pat. No. 8,763,629.

(60) Provisional application No. 61/798,996, filed on Mar. 15, 2013.

(51) Int. Cl.
    *F16K 31/20* (2006.01)

(52) U.S. Cl.
    CPC ......... *F16K 31/20* (2013.01); *Y10T 137/7303* (2015.04)

(58) Field of Classification Search
    CPC ..... F16K 31/20; F16K 31/22; Y10T 137/7303
    See application file for complete search history.

(56) References Cited

U.S. PATENT DOCUMENTS

| | | |
|---|---|---|
| 805,003 A | 11/1905 | Clarey |
| 1,176,785 A | 3/1916 | Stielow |
| 1,310,560 A | 7/1919 | Cook |
| 1,340,999 A | 5/1920 | Wilson |
| 1,704,501 A | 3/1929 | Force |
| 2,155,400 A | 4/1939 | Caminiti |
| 2,384,628 A | 9/1945 | Krone et al. |
| 2,415,875 A * | 2/1947 | Greenwald ............. F16K 31/22 137/433 |
| 2,715,414 A | 8/1955 | Kinzbach et al. |
| 2,716,422 A * | 8/1955 | Whitlock, Jr. ........... G05D 9/02 137/391 |
| 2,920,644 A | 1/1960 | Schulze et al. |

(Continued)

OTHER PUBLICATIONS

Krynski, William "Notification of Transmittal of The International Search Report and The Written Opinion of the International Searching Authority, or the Declaration," dated Nov. 4, 2014, Applicant Name: Hugo Antonio M Acosta; International Application No. PCT/US2014/029127; International Filing date Mar. 14, 2014.

(Continued)

*Primary Examiner* — Mary McManmon
*Assistant Examiner* — Patrick Williams
(74) *Attorney, Agent, or Firm* — Gunn, Lee & Cave, P.C.

(57) ABSTRACT

The double action float valve is connected to a single pipe and a tank and controls both the filling and discharge of the tank. The double action float valve utilizes a valve body, an obturator positioned within the valve body, a unidirectional device, and a float connected to the obturator. When the inflow pressure from the pipe is greater than the outflow pressure of the tank, the tank is filled until the float reaches a predetermined level. When the outflow pressure of the tank is greater than the inflow pressure, the double action float valve is automatically reconfigured to discharge the fluid from the tank into the pipe.

15 Claims, 8 Drawing Sheets

(56) References Cited

U.S. PATENT DOCUMENTS

| | | | | |
|---|---|---|---|---|
| 2,935,081 | A | * 5/1960 | Kryzer | F16K 31/22 |
| | | | | 137/391 |
| 3,005,465 | A | * 10/1961 | Whitlock | F16K 31/20 |
| | | | | 137/391 |
| 3,211,170 | A | 10/1965 | White | |
| 3,662,793 | A | 5/1972 | Calisher et al. | |
| 4,051,030 | A | 9/1977 | Huiet, Jr. | |
| 4,193,417 | A | * 3/1980 | Bowman | E03B 11/06 |
| | | | | 137/192 |
| 4,735,226 | A | 4/1988 | Szlaga | |
| 4,905,726 | A | 3/1990 | Kasugai et al. | |
| 4,991,615 | A | 2/1991 | Szlaga et al. | |
| 5,365,970 | A | * 11/1994 | Butler | A01C 23/042 |
| | | | | 137/192 |
| 6,296,016 | B1 | 10/2001 | Parker et al. | |
| 7,584,766 | B2 | 9/2009 | David et al. | |
| 2011/0186149 | A1 * | 8/2011 | Tagami | F16K 31/18 |
| | | | | 137/409 |

OTHER PUBLICATIONS

Estrada, Asensio G., Supplementary European Search Report and Written Opinion in PCT/IB2014001263 dated Sep. 26, 2016, The Hague.

* cited by examiner

DOUBLE ACTION FLOAT VALVE

CROSS-REFERENCES TO RELATED APPLICATIONS

This continuation in part application claims the benefit of U.S. provisional application Ser. No. 61/798,996 filed Mar. 15, 2013 entitled Double Action Float Valve and U.S. patent application Ser. No. 14/035,672 entitled Double Action Float Valve, which are both incorporated by reference herein.

STATEMENT REGARDING FEDERALLY SPONSORED RESEARCH OR DEVELOPMENT

Not applicable.

BACKGROUND OF THE INVENTION

1. Field of the Invention

The present invention relates to the field of flow valves as used in the filling and discharge of fluid from a tank.

2. Description of the Related Art

There are several different kinds of float valves that are used to control the filling of tanks. A basic float valve system is the direct-operated float valve. This system is installed in the upper part of a tank and when the tank is full the float pushes or pulls a piston resulting in the stoppage of flow into the tank. When the pressure is high, the float doesn't have enough power to stop the flow of fluid which results in leaks. To overcome this issue in larger tanks, more sophisticated float valves are utilized which results in higher cost.

There are other valves, such as pilot operated, that may be used in high pressures or with large diameter pipes. In this system, when the tank is full, the valve is closed using line pressure. These types of valves are complex and require multiple parts to ensure proper function.

The methods listed above require a pipe to fill the tank and an additional pipe to discharge liquid from the tank. This requires additional cost to construct, maintain, and increases the risk of problems occurring within the lines.

There is a need for a double action float valve that can work on a single line for both inflow and outflow as well as in high pressure applications.

SUMMARY OF THE INVENTION

The objective of the double action float valve is to supply a new valve that is superior to the current float valves on the market. The primary advantage to the double action float valve is the ability to operate through a single inflow and outflow pipe.

The double action float valve utilizes a valve body mounted in a tank. The valve body is connected to an inflow/outflow pipe that is connected to a fluid supply. An obturator and a unidirectional device are located within the valve body. The obturator is connected to a float that is positioned outside the valve body and within the tank. When the pressure of fluid from the inflow/outflow pipe is greater than the opposing pressure from the tank, fluid enters the interior of the valve by passing through a first opening through the valve body and into the tank. As the fluid level in the tank rises, the float rises. Once the float reaches a predetermined level in the tank, the obturator blocks a second opening through the valve body which closes the fluid communication pathway between the inflow/outflow pipe and the tank.

When the pressure from the tank, as measured at a third opening through the valve body positioned at the unidirectional device, is greater than the inflow pressure from the inflow/outflow pipe, the resulting pressure opens the unidirectional device which causes fluid to enter the interior of the valve through the third opening through the valve body and out the inflow/outflow pipe. As the fluid level decreases, the float becomes slack causing the obturator to disengage from the second opening which allows fluid communication pathway between the tank and the interior of the valve through the second opening. Fluid then flows through the second opening in the valve body, into the interior of the valve and out the inflow/outflow pipe.

The double action float valve works in conjunction with a main fluid conduit. Should the main fluid conduit decrease in pressure for any reason such as increased demand or decreased pumping pressure upstream, the double action float valve supplements the fluid pressure by discharging fluid. When fluid pressure is high or normal, the tank is automatically filled through double action float valve and maintained as full until needed.

DETAILED DESCRIPTION OF THE INVENTION

Figure 1:
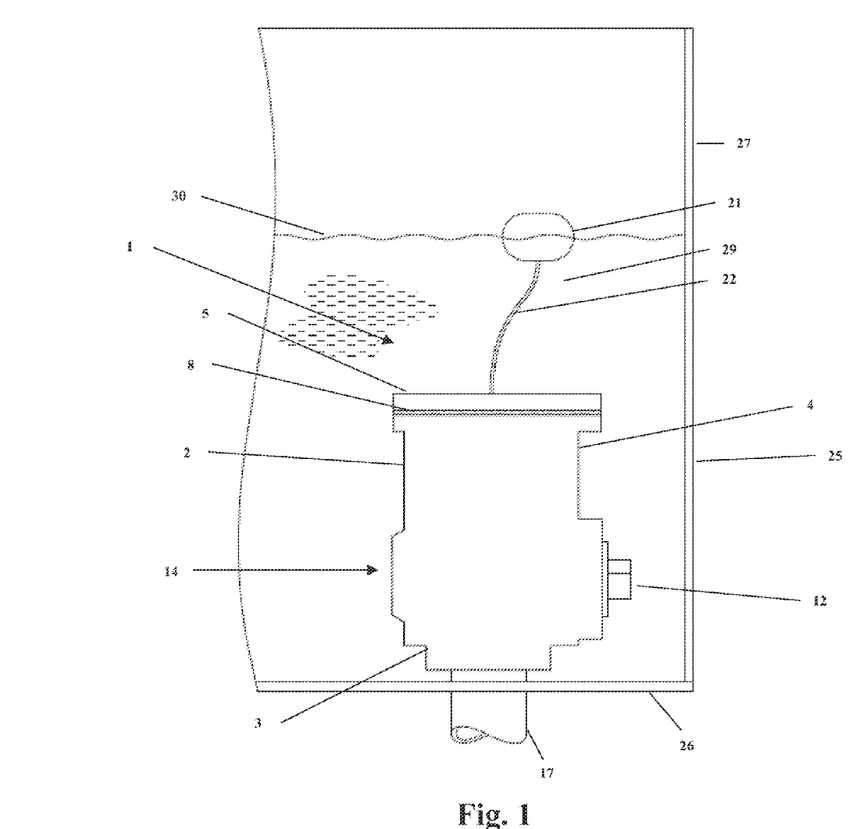
FIG. 1 is a profile view of an embodiment.
Figure 2:
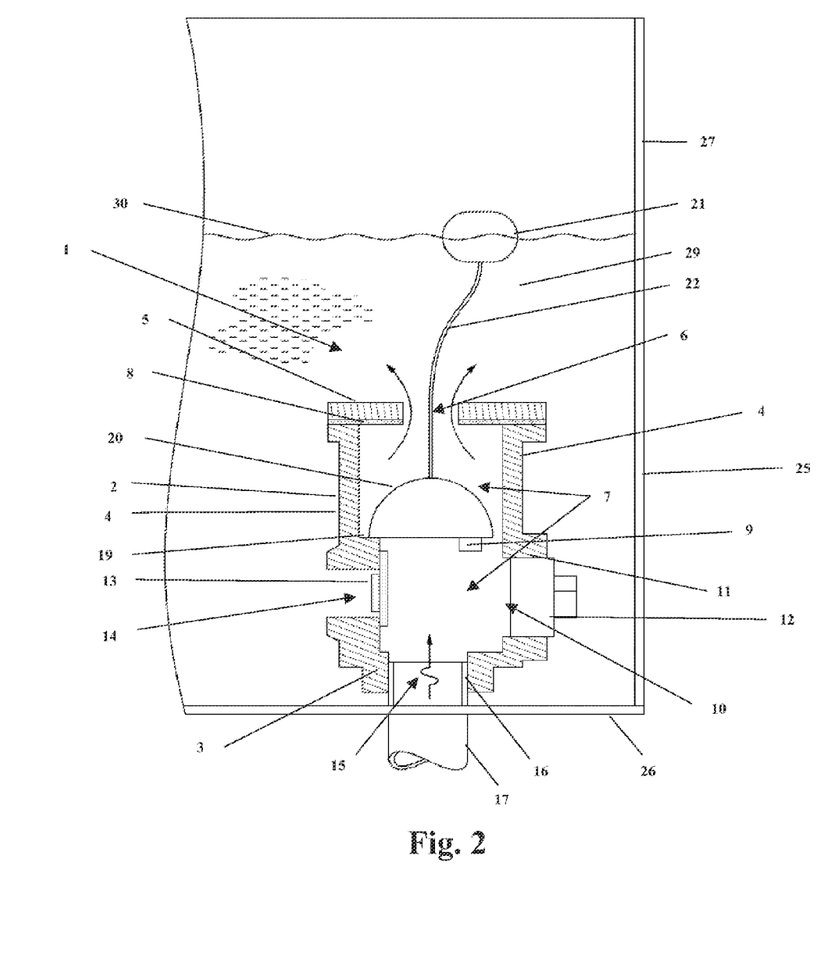
FIG. 2 is a cross-section view of an embodiment during inflow of a liquid.

Referring to FIGS. 1 and 2, the double action float valve 1 comprises a valve body 2, unidirectional device 13, inflow/outflow pipe 17, obturator 20, and external float 21. In the illustrated embodiment, the double action float valve 1 is installed along the bottom 26 of a tank 25. The valve body 2 is the outer housing of the valve and is comprised of a bottom 3, sidewall 4, and a top 5 which form a valve cavity 7 within. A filling/discharge opening 6 through the valve body 2 is positioned at the top 5. A gasket 8 is positioned between the top 5 and the sidewall 4. A sidewall opening 10 and an unidirectional device opening 14 extend through the sidewall 4 of the valve body 2. An inflow/outflow pipe opening 15 extends through the valve body 2 at the bottom 3. The filling/discharge opening 6 and unidirectional device opening 10 create a fluid communication pathway between the tank interior 28 and the valve cavity 7. The sidewall opening 10 and inflow/outflow pipe opening 15 create a fluid communication pathway between the outside of the valve body 2 and the valve cavity 7. The sidewall opening 10 and inflow/outflow pipe opening 15 may be located outside the tank 25 or in the tank interior 28 depending on the physical location of the valve body 2 in reference to the tank 25.

A plug 12 is connected to the sidewall 4 at the sidewall opening 10 by a connector 11. An inflow/outflow pipe 17 is connected to the bottom 3 at the inflow/outflow pipe opening 15 by a connector 16. Connectors 11, 16 may be a screw, glue, coupling, flange or any standard method of connecting a pipe or plug to a valve body. In the illustrated embodiment the plug 12 and inflow/outflow pipe 17 are identically sized such that they may be interchanged and fit either the sidewall opening 10 or inflow/outflow pipe opening 15. The unidirectional device 13 is positioned within said valve body 2 and arranged with shoulder 19 to selectively open and close the unidirectional device opening 14. The unidirectional device 13 permits flow in one direction.

Figure 3:
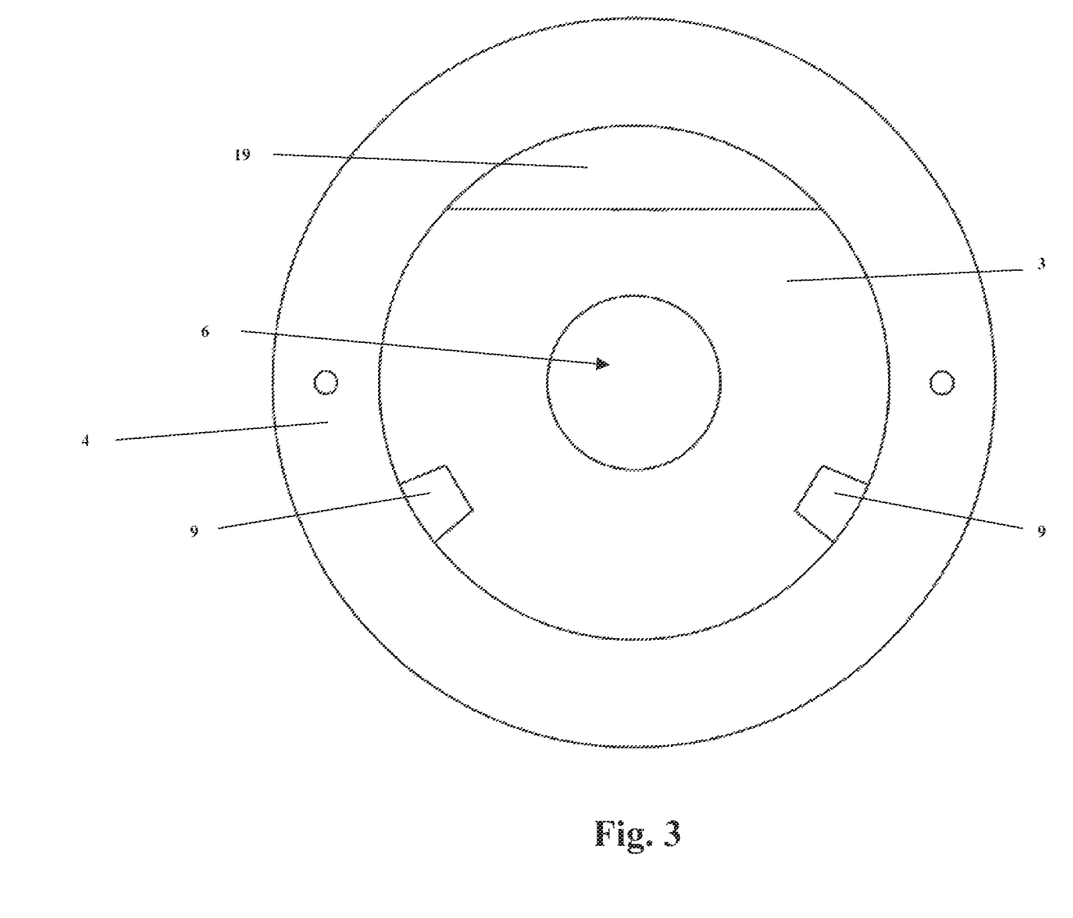
FIG. 3 is a top down view of an embodiment with the top and obturator removed.

As seen in FIGS. 2 and 3, the illustrated embodiment of the valve body 2 is cylindrical in shape. Posts 9 extend from the interior surface 18 of sidewall 4 into the cavity 7. A shoulder 19 positioned above unidirectional device opening 14 also extends from the interior surface 18 of the sidewall 4. Referring back to FIG. 2, the posts 9 and shoulder 19 and positioned so that their top surfaces are positioned above the unidirectional device opening 14 and the sidewall opening 10 and have the same height.

An obturator 20 is positioned within the valve body 2. The obturator 20 is connected to an external float 21 located in the tank 25 via linkage 22. Obturator 20 is made of a material having a density greater than the fluid utilized in operation of the double action float valve 1. Linkage 22 extends from the external float 21, through tank interior 28, through the filling/discharge opening 6 where it connects to the obutrator 20. Linkage 22 may be flexible and is strong enough to hold the obturator 20 against the gasket 8 of the top 5 without breaking. Examples of linkage depend on the weight of the obturator 20 but such linkage may be a chain, rope, plastic line, or cable. The shape of the obturator 20 may be spherical, hemi-spherical or other suitable shape such that it is of sufficient size to block the filling/discharge opening 6 and remain wholly or partially within the valve cavity 7 by top 5.

Figure 5:
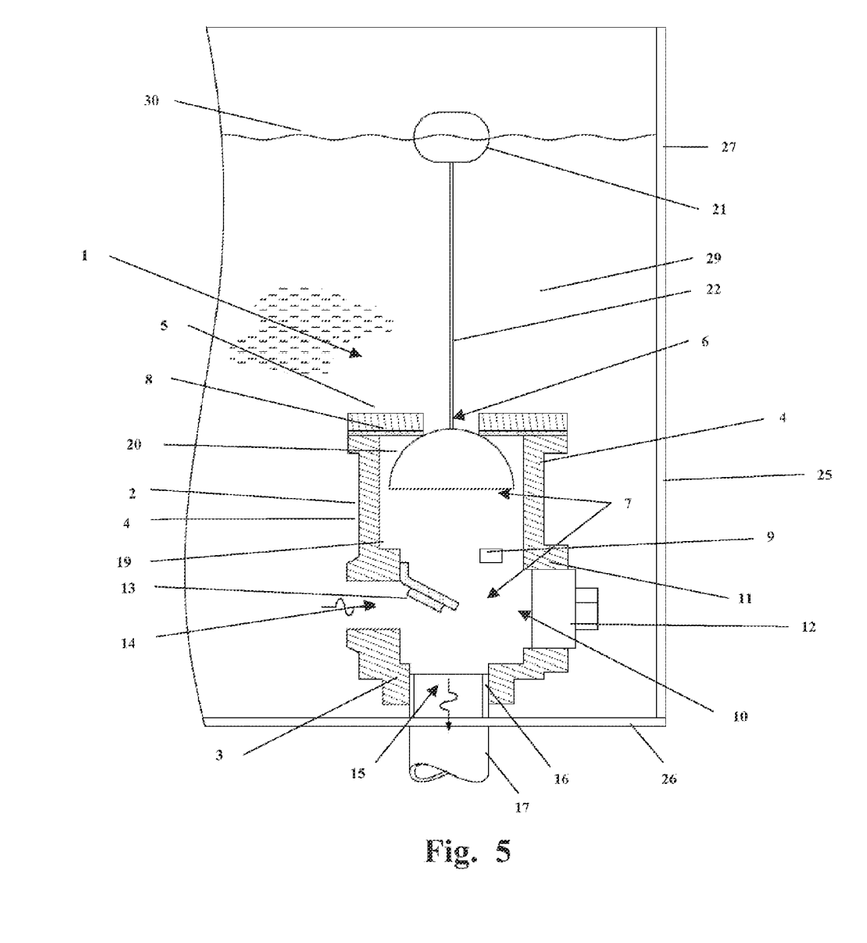
FIG. 5 is a cross-section view of an embodiment when the pressure in the tank exceeds the pressure in the inflow pipe and fluid passes through the unidirectional device.
Figure 6:
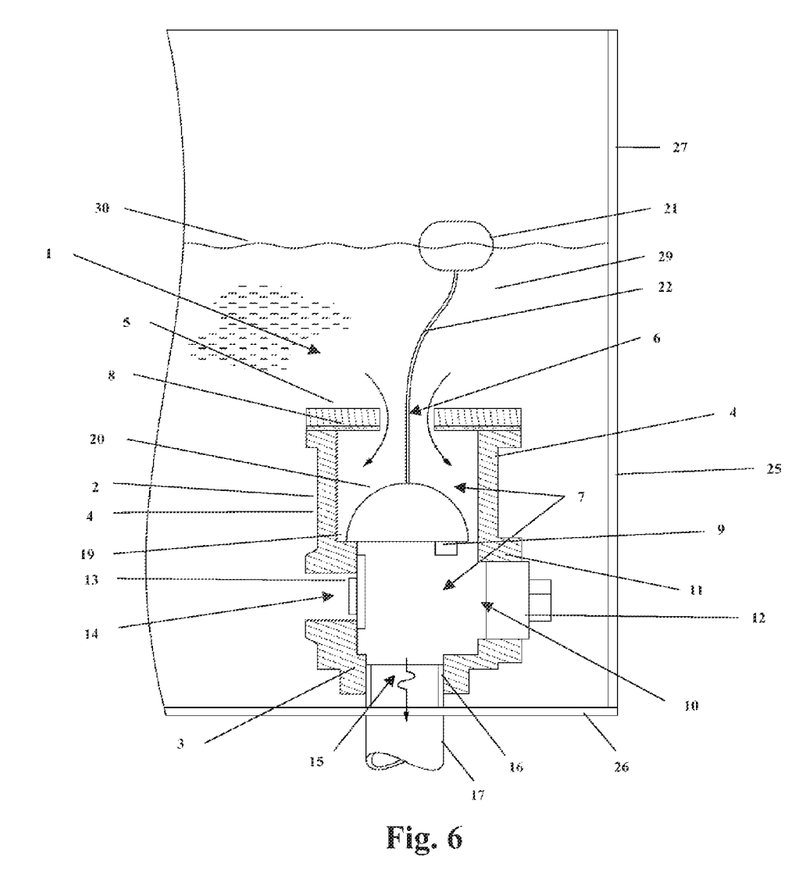
FIG. 6 is a cross-section view of an embodiment during outflow of a fluid from a tank.
Figure 7:
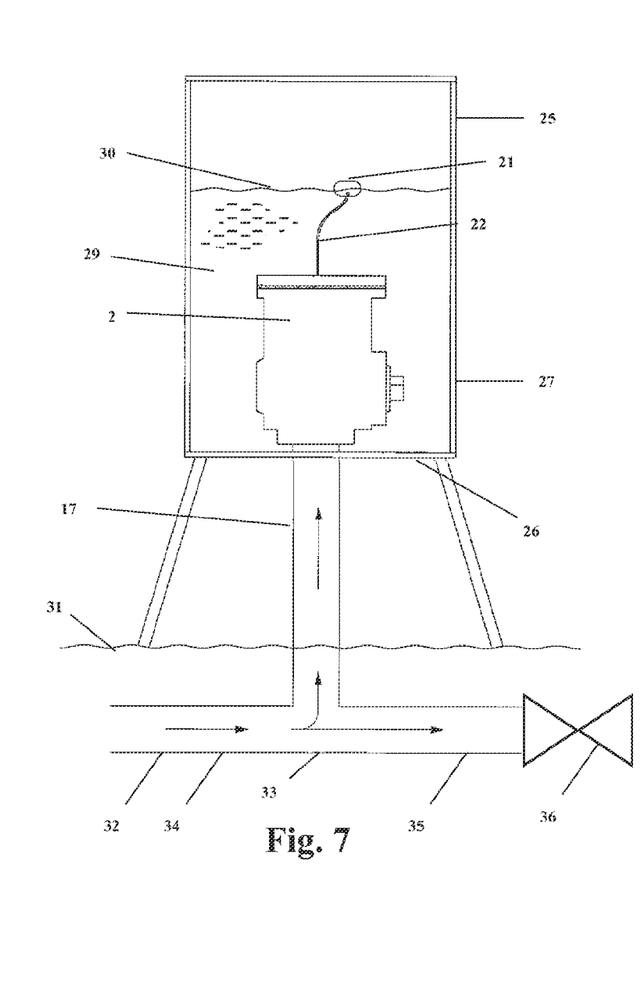
FIG. 7 is a view of a system utilizing the embodiment of the double action float valve to fill a tank.

The operation of the double action float valve 1 is described in reference to FIGS. 2 and 4-10. FIGS. 2 and 7 disclose the filling of tank 25 through the double action float valve 1. When the tank 25 is not full of fluid 29, the linkage 22 connecting the external float 21 is lax with respect to obturator 20. As a result, obturator 20 rests on the posts 9 and shoulder 19 of the valve body 2. A fluid supply conduit 32 carrying a fluid is in fluid communication with the inflow/outflow pipe 17 at junction 33. At junction 33 flow of the fluid from the pre junction portion 34 of the fluid supply conduit 32 is split into two components. The first component continues through the junction 33 and through the post-junction portion of the fluid supply conduit 32. The second component flows from the junction 33 into the inflow/outflow pipe 17. The fluid flows from the inflow/outflow pipe 17 into the valve cavity 7 of the double action float valve 1. As fluid flows into the valve cavity 7, the fluid pressure in the valve cavity at the unidirectional device opening 14, created by the inflow of fluid from the inflow/outflow pipe 17, is greater than the external pressure at the unidirectional device opening 14 created by the fluid pressure in the tank 25. As a result the unidirectional device 13 is closed and blocking the fluid communication pathway through the unidirectional device opening 14. A plug 12 blocks the fluid communication pathway through the sidewall opening 10.

The fluid flows through the valve cavity, around the obturator 22, and through the filling/discharge opening 6 into the tank 25 so long as the fluid pressure within the valve cavity, as measured on the internal side of the filling/discharge opening 6, is greater than the opposing fluid pressure as measured on the external side of the filling/discharge opening 6. In this regard the weight of the obturator 20 is sufficient to prevent the flow of the fluid from moving the obturator 20 upwards and blocking the filling/discharge opening 6. As the tank 25 fills with fluid, the external float 21 rises as the fluid level 30 rises. As the fluid level 30 rises, the linkage 22 becomes more taught.

Figure 4:
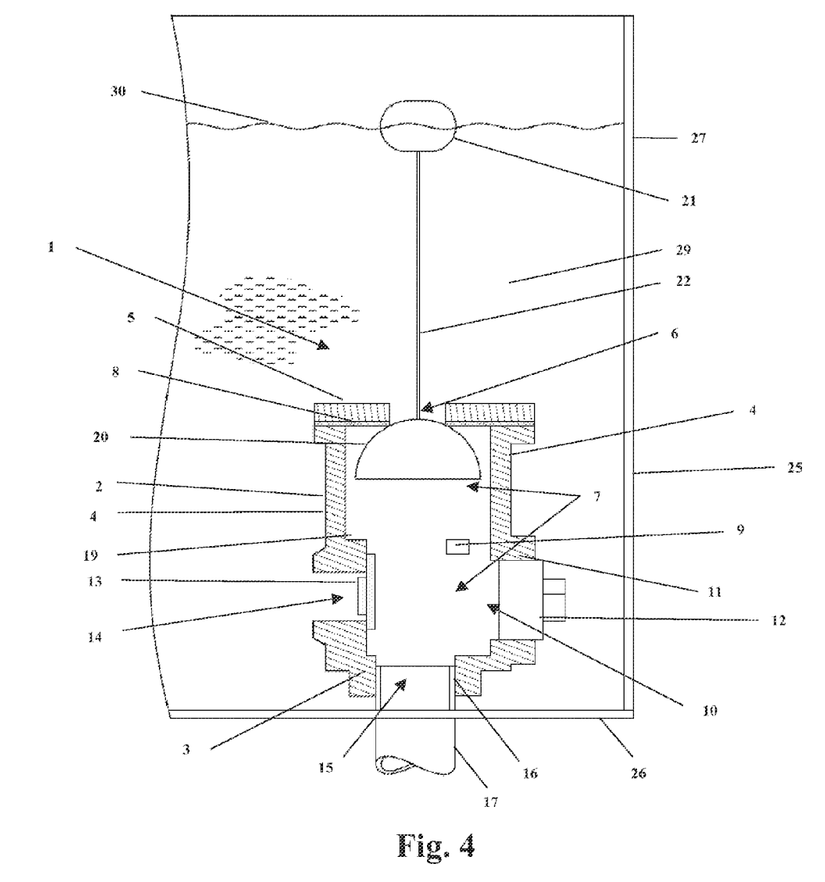
FIG. 4 is a cross-section view of an embodiment when the tank is full.
Figure 8:
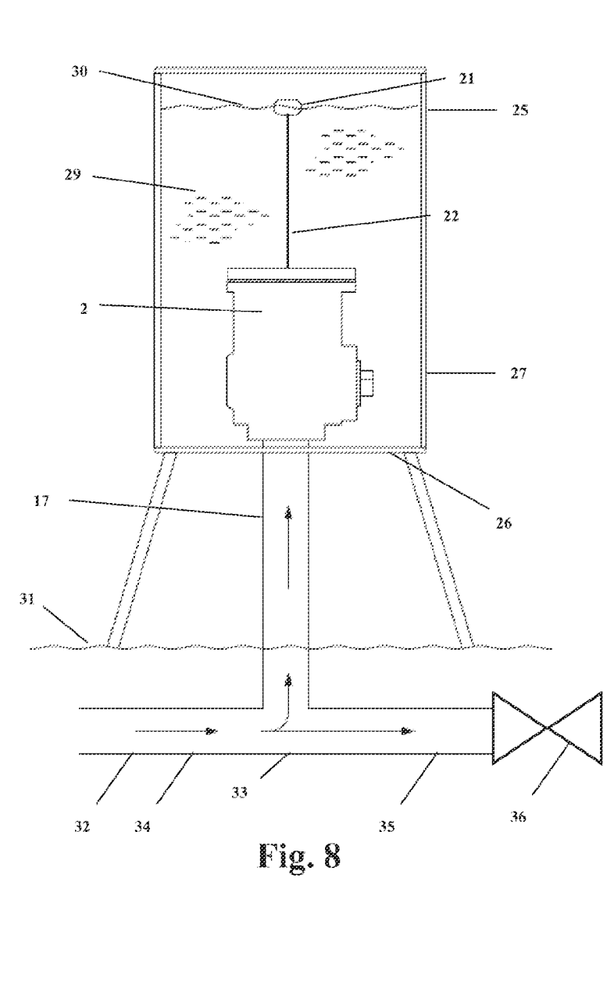
FIG. 8 is a view of a system utilizing the embodiment of the double action float valve when the tank is full.

Referring to FIGS. 4 and 8, once the tank 25 becomes full (i.e. when the tank reaches a predetermined level based on the length of the linkage) the linkage 22 is fully taught which causes the obturator 20 to be pulled against the gasket 8 positioned below top 5. In this position the obturator 20 blocks the filling/discharge opening 6 and closes the fluid communication path between the valve cavity 7 and the tank interior 28 through the filling/discharge opening 6. The unidirectional device opening 14 remains closed by the unidirectional device 13 so long as the fluid pressure within the valve cavity 7 at the unidirectional device opening 14, created from the pressure of fluid from the inflow/outflow pipe 17, remains greater than the external pressure at the unidirectional device opening 14 created by the pressure of the fluid 29 in the tank 25. With both the unidirectional device opening 14 and the filling/discharge opening 6 closed, the fluid level 30 in the tank 25 remains static.

Figure 9:
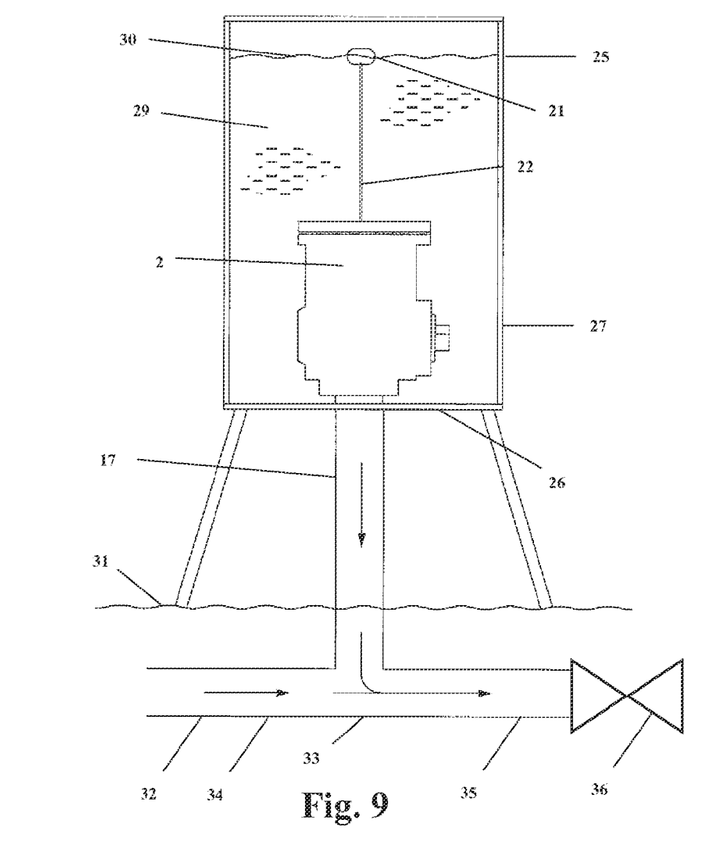
FIG. 9 is a view of a system utilizing the embodiment of the double action float valve when the pressure in the tank exceeds the pressure in the embodiment of the double action float valve.

Referring to FIGS. 5 and 9, when the pressure from the inflow/outflow pipe 17 decreases such that the internal pressure at the unidirectional device opening 14 becomes lower than the fluid pressure in the tank at the unidirectional device opening 14, the unidirectional device 13 opens creating a fluid communication pathway from the tank interior 28 into the valve cavity 7 through unidirectional device opening 14. As a result of the greater pressure of the fluid entering the cavity 7 from the tank 25 through unidirectional device opening 14, as compared to the pressure of the fluid from the inflow/outflow pipe opening 15, the fluid flows from the valve cavity 7 into the inflow/outflow pipe opening 15 towards junction 33 through inflow/outflow pipe 17.

Figure 10:
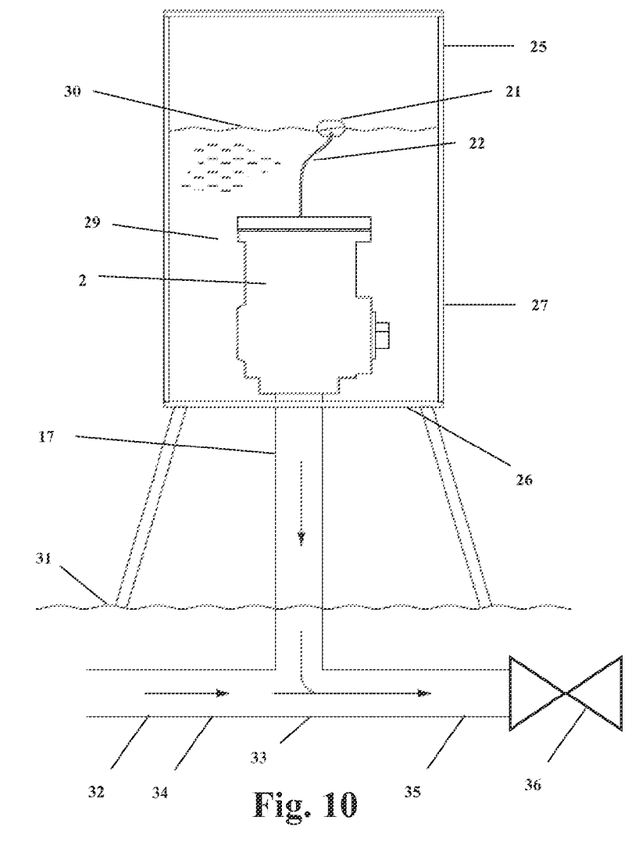
FIG. 10 is a view of a system utilizing the embodiment of the double action float valve during outflow of a fluid from a tank.

Referring to FIGS. 6 and 10, as the fluid level 30 in the tank 25 decreases, slack in linkage 22 is created causing the obturator 20 to disengage from the gasket 8 of the top 5 and unblocking the filling/discharge opening 6. Fluid flows from the tank interior 28 into valve cavity 7 through the filling/discharge opening 6. The fluid flows around the obturator 20 and through the valve cavity 7 to the inflow/outflow pipe 17 through inflow/outflow pipe opening 16. The obturator 20 moves downward to rest on the posts 9 and shoulder 19 once sufficient slack in linkage 22 is created by the falling fluid level 30 in the tank interior 28. Once the internal pressure of the fluid in the valve cavity 7 at the unidirectional device opening 14 becomes greater than the external pressure at the unidirectional device opening 14, the unidirectional device 13 closes.

In operation, the main fluid supply conduit 32 is supplied by a source of fluid (not shown). The fluid is supplied through a pump, gravity fed, or a combination thereof. The main fluid supply conduit 32 is comprised of a pre junction conduit 34, junction 33, and post-junction conduit 35. The inflow/outflow pipe 17 connects to the main fluid supply conduit 32 at junction 33. At the opposing end of the main fluid supply conduit 32 from the source of fluid, is a valve or series of valves 36 that control outlet of fluid from the main fluid supply conduit 32. Valve 36 may be the outlets in a city corresponding to faucets, toilets or other valves allowing outlet of fluid. As the valve 36 opens fluid flows out of the post-junction conduit 36. The post-junction conduit 35 can be supplied with fluid from the pre-junction conduit 34, the inflow/outflow pipe 17, or a combination of both.

If the tank 25 is not full, fluid flows into the tank 25 when the fluid at the junction 33 is higher than the pressure at the filling/discharge opening 6 as described in reference to FIG. 2. The pressure in pre junction 34 is dependent on the supply and demand, with supply being determined by the fluid supply pressure and flow and the demand being determined by the flow from valve 36. Once the tank 25 is filled to a predetermined level as described in reference to FIG. 4, fluid no longer flows into the tank 25. If the pressure at the junction 33 becomes lower than the fluid pressure in the tank 25 at the unidirectional device opening 14, the unidirectional device 13 opens allowing fluid to flow from the tank, through the inflow/outflow pipe 17, through the junction 33 and into the post-junction conduit 35 as described in FIGS. 5 and 6. A backflow preventer may be utilized at the junction 33 to prevent flow from the junction 33 into the pre junction conduit 34.

The disclosed embodiment and system is designed in such a manner to maintain a minimum fluid pressure and fluid flow at valve 36 so long as some fluid is capable of flowing from the tank 25 into the valve cavity 7 and inflow/outflow pipe 17. When demand at valve 36 is greater than the supply in the pre junction conduit 34, tank 25 can supplement fluid flow at valve 36. Demand at valve 36 may be greater than the supply during peak usage times or during instances of weakened supply. When the supply is greater than the demand, such that the pressure at junction 33 is greater than the pressure at filling/discharge opening 6, then tank 25 is filled until reaching the predetermined level.

To change the level of tank fill, the operator simply needs to lengthen or shorten the linkage 22 so that external float 21 pulls the linkage 22 taught at the predetermined level.

The placement of the double action float valve 1 within the tank 25 is dependent upon the location of the inflow/outflow pipe 17. The double action float valve 1 may be mounted in the bottom of the tank 26, side of the tank 27 or a corner of the tank. Depending on the location of the double action float valve 1 within the tank 25, the inflow/outflow pipe may be moved from the inflow/outflow pipe opening 15 to the sidewall opening 10. In another embodiment the connectors 11, 16 may be mounted outside the tank wall such that the plug 12 and inflow/outflow pipe 17 are accessible from outside the tank 25 and may be connected through the sidewall of the tank 25. In a further embodiment of the double action float valve 1 there is no sidewall opening 10.

The double action float valve can be manufactured with metallic or non-metallic materials, such as plastic, resins, etc. It can handle any type of liquids, corrosive and non-corrosive. The double action float valve may be applied to pipes of virtually all sizes. The double action float valve is to be preferably installed at the bottom of the tank. However, it is anticipated that it can be installed at various levels. The double action float valve can be light, simple in operation and manufactured with a small number of pieces, which makes it economic and unlikely to fail.

The present invention is described above in terms of a preferred illustrative embodiment of a specifically-described double action float valve. Those skilled in the art will recognize that alternative constructions of such a device can be used in carrying out the present invention. Aspects such as the shape of the openings, shape of the valve body, shape and characteristics of the obturator, and unidirectional device are changeable without affecting the principles of the invention. Other aspects, features, and advantages of the present invention may be obtained from a study of this disclosure and the drawings, along with the appended claims.

I claim:

1. A float valve comprising:
   a valve body defining an interior valve cavity;
   a first opening which extends through said valve body from said interior valve cavity to the exterior of said valve body and allowing fluid communication between a fluid inflow/outflow pipe and said valve cavity;
   a second opening which extends through said valve body from said interior valve cavity to the exterior of said valve body and allowing fluid communication between the interior of a tank capable of storing a fluid and said interior valve cavity;
   a third opening which extends through said valve body from said interior valve cavity to the exterior of said valve body and allowing fluid communication between said interior of said tank and said interior valve cavity;
   a first obturator having a density greater than the density of said fluid, positioned within said interior valve cavity;
   a unidirectional device associated with said third opening controlling said fluid communication through said third opening; and
   a float connected to said obturator.

2. The float valve of claim 1 wherein said obturator can move between first position wherein said obturator blocks fluid communication through said second opening and a second position wherein fluid communication through said second opening is allowed.

3. The float valve of claim 2 wherein the vertical level of said float causes said obturator to move between said first position and said second position.

4. The float valve of claim 1 wherein said unidirectional device can adjust between a first position wherein said unidirectional device blocks said fluid communication through said third opening and a second position wherein fluid communication through said third opening is allowed.

5. The float valve of claim 4 wherein fluid communication between said interior valve cavity and said interior of said tank is blocked when said obturator is in said first position and said unidirectional device is in said first position.

6. A float valve comprising:
   a valve body defining an interior valve cavity;
   a first opening through said valve body creating a first fluid communication path between a fluid inlet and said interior valve cavity;
   a second opening through said valve body creating a second fluid communication path between the interior of a tank capable of storing a fluid and said interior valve cavity;
   a third opening through said valve body creating a third fluid communication path between said interior of a tank and said interior valve cavity;
   wherein said second fluid communication path and said third fluid communication path are different;
   a first obturator having a density greater than the density of said fluid, positioned within said interior valve cavity;

a unidirectional device associated with said third opening; and a float connected to said obturator.

7. The float valve of claim 6 wherein said obturator can move between first position wherein said obturator blocks said second fluid communication path and a second position wherein said second fluid communication path is unblocked.

8. The float valve of claim 7 wherein the vertical level of said float causes said obturator to move between said first position and said second position.

9. The float valve of claim 6 wherein said unidirectional device can adjust between a first position wherein said third fluid communication path is blocked and a second position wherein said third fluid communication path is unblocked.

10. The float valve of claim 9 wherein said third fluid communication path is blocked when said obturator is in said first position and said unidirectional device is in said first position.

11. A float valve comprising:

a valve body defining an interior valve cavity;

a first opening through said valve body allowing fluid communication between a fluid inlet exterior to said valve body and said interior valve cavity through said first opening;

a second opening through said valve body allowing fluid communication between the interior of a tank capable of storing a fluid and said interior valve cavity through said second opening;

a third opening through said valve body allowing fluid communication between said interior of said tank and said interior valve cavity through said third opening;

a first obturator having a density greater than the density of said fluid, positioned within said valve cavity;

a unidirectional device positioned adjacent said third opening; and a float connected to said obturator.

12. The float valve of claim 11 wherein said obturator can move between first position wherein said obturator blocks fluid through said second opening and a second position wherein fluid communication through said second opening is allowed.

13. The float valve of claim 12 wherein the vertical level of said float causes said obturator to move between said first position and said second position.

14. The float valve of claim 11 wherein said unidirectional device can adjust between a first position wherein said unidirectional device blocks said fluid communication through said third opening and a second position wherein fluid communication through said third opening is allowed.

15. The float valve of claim 14 wherein fluid communication between said valve cavity and said interior of said tank is blocked when said obturator is in said first position and said unidirectional device is in said first position.

* * * * *